US011507902B2

(12) United States Patent
McAlpine et al.

(10) Patent No.: US 11,507,902 B2
(45) Date of Patent: Nov. 22, 2022

(54) SYSTEM AND METHOD FOR VEHICLE PROJECT TRACKING

(71) Applicant: Caterpillar Paving Products Inc., Brooklyn Park, MN (US)

(72) Inventors: Jacob J. McAlpine, Otsego, MN (US); John L. Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 198 days.

(21) Appl. No.: 16/786,855

(22) Filed: Feb. 10, 2020

(65) Prior Publication Data

US 2021/0248539 A1    Aug. 12, 2021

(51) Int. Cl.
| | |
|---|---|
| *G06Q 30/00* | (2012.01) |
| *G06Q 10/06* | (2012.01) |
| *G06F 3/04817* | (2022.01) |
| *G06F 16/29* | (2019.01) |
| *E01C 19/00* | (2006.01) |
| *G07C 5/08* | (2006.01) |

(Continued)

(52) U.S. Cl.
CPC . *G06Q 10/063114* (2013.01); *G06F 3/04817* (2013.01); *G06F 16/29* (2019.01); *G06Q 10/06313* (2013.01); *E01C 19/004* (2013.01); *G05B 19/0405* (2013.01); *G06F 3/048* (2013.01); *G07C 5/0841* (2013.01)

(58) Field of Classification Search
CPC ..... G06Q 10/063114; G06Q 10/06395; G06Q 10/00; G06Q 10/02; G06Q 10/06; G06Q 10/10; G06Q 30/02; G06F 16/29; G06F 3/04817; G05B 2219/31357
See application file for complete search history.

(56) References Cited

U.S. PATENT DOCUMENTS

| | | | |
|---|---|---|---|
| 6,496,775 B2 | 12/2002 | McDonald, Jr. et al. | |
| 2010/0099460 A1* | 4/2010 | Skelton | G01C 15/00 455/556.2 |

(Continued)

OTHER PUBLICATIONS

Dinkar, Ambade Shruti, and S. A. Shaikh. "Design and implementation of vehicle tracking system using GPS." Journal of Information Engineering and Applications 1.3 (2011): 1-7. (Year: 2011).*

*Primary Examiner* — Joseph M Waesco
*Assistant Examiner* — Jay-Ming Wang
(74) *Attorney, Agent, or Firm* — Lee & Hayes, PC

(57) ABSTRACT

A method includes receiving first location information of a first vehicle, and associating the first vehicle with a first project. The method also includes receiving second location information from a second vehicle, and associating the second vehicle with a second project. The method further includes providing, to an electronic device, instructions to output a user interface that includes a map, and a first visual indicia displayed on the map at a first location corresponding to the first location information, where the first visual indicia indicates that the first vehicle is associated with the first project. The user interface further includes a second visual indicia displayed on the map at a second location corresponding to the second location information, where the second visual indicia indicates that the second vehicle is associated with the second project, and is different from the first visual indicia.

8 Claims, 6 Drawing Sheets

(51) Int. Cl.
   *G06F 3/048*      (2013.01)
   *G05B 19/04*      (2006.01)

(56) References Cited

U.S. PATENT DOCUMENTS

| | | | | |
|---|---|---|---|---|
| 2011/0283217 | A1* | 11/2011 | Nielsen | G06F 3/0482 |
| | | | | 715/771 |
| 2015/0161553 | A1* | 6/2015 | Eggleston | H04W 4/021 |
| | | | | 705/7.15 |
| 2016/0042010 | A1* | 2/2016 | Schuler | G06F 16/29 |
| | | | | 707/769 |
| 2016/0048795 | A1* | 2/2016 | Walton | H04W 4/021 |
| | | | | 705/7.15 |
| 2016/0171633 | A1* | 6/2016 | DeWalt | G06Q 10/06398 |
| | | | | 705/7.15 |
| 2017/0205999 | A1* | 7/2017 | Marsolek | G06F 3/0482 |
| 2018/0121861 | A1* | 5/2018 | Morgenthau | G06Q 10/063114 |
| 2018/0260753 | A1* | 9/2018 | Werklund | G06N 5/022 |
| 2019/0095846 | A1* | 3/2019 | Gupta | G06Q 10/063114 |
| 2019/0332785 | A1* | 10/2019 | AthuluruTlrumala | H04W 8/005 |

* cited by examiner

SYSTEM AND METHOD FOR VEHICLE PROJECT TRACKING

TECHNICAL FIELD

The present disclosure relates to a vehicle tracking system. More specifically, the present disclosure relates to a vehicle tracking system including a control system configured to determine and track vehicle states throughout a project, and amongst different projects.

BACKGROUND

Vehicles, such as haul trucks, are often used to perform a variety of tasks associated with a worksite or project. For example, one or more haul trucks may be used to transport paving material from a paving material plant to a worksite so that the paving material may be distributed along a work surface of the worksite by one or more paving machines. In some cases, a jobsite management application may be provided by an electronic device associated with a user that presents a user interface including locations of one or more haul trucks on a map. However, in some situations, it may be difficult to determine a project or jobsite associated with the one or more haul trucks from amongst multiple projects and/or jobsites when the vehicle is simply depicted on a map. Thus, foreman or other workers involved with a project lack the ability to evaluate productivity and/or impedances of a specific project or worksite.

For instance, U.S. Pat. No. 6,496,775 (hereinafter referred to as the '775 reference) relates to automatic tracking of vehicles during delivery operations. The '775 reference describes, for example, providing visual indicators regarding the identity, location, and delivery state of each vehicle within a fleet of vehicles, while employing allowable states and state transitions to effect status reporting for delivery conditions of the vehicles. However, the '775 reference does not distinguish between different projects and/or jobsites via a visual indicator on a map that depicts multiple projects and/or jobsites. As a result, the system described in the '775 reference is not configured to, among other things, provide a user interface that allows a foreman or other workers to distinguish between vehicles associated with different projects.

Examples of the present disclosure are directed toward overcoming the deficiencies described above.

SUMMARY

In an example of the present disclosure, a method includes receiving, with a controller, first project information associated with a first project, and associating, with the controller, a first vehicle with the first project based at least in part on the first project information. The method also includes receiving, with the controller, first location information from the first vehicle. The method also includes receiving, with the controller, second project information associated with a second project, and associating, with the controller, a second vehicle with the second project based at least in part on the second project information. The method also includes receiving, with the controller, second location information from the second vehicle. The method further includes providing, with the controller and to an electronic device associated with a user, instructions to output a user interface that includes a map, and a first visual indicia displayed at a first location on the map corresponding to the first location information, where the first visual indicia indicates that the first vehicle is associated with the first project. The user interface further includes, according to the instructions, a second visual indicia displayed at a second location on the map corresponding to the second location information, where the second visual indicia indicates that the second vehicle is associated with the second project, and is different from the first visual indicia.

In another example of the present disclosure, a system includes a haul truck configured to haul material from a paving material plant to a worksite, and a system controller in communication with a controller of the haul truck. In such examples, the system controller is configured to receive first location information indicating that the haul truck is located at the paving material plant, and associate the haul truck with a project associated with the worksite. In such examples, the system controller is further configured to generate first instructions which, when executed by an electronic device, cause the electronic device to display a user interface comprising a map illustrating the paving material plant, and visual indicia representing the haul truck being disposed at the paving material plant, where the visual indicia is indicative of the project. Further, in such examples, the system controller is further configured to provide the first instructions to an electronic device via a network. In such examples, the system controller is further configured to receive second location information indicating that the haul truck has departed the paving material plant, generate second instructions which, when executed by the electronic device, cause the electronic device to update a location of the visual indicia on the map and to change a characteristic of the visual indicia to indicate that the haul truck has left the paving material plant, and provide the second instructions to the electronic device via the network. Additionally, in such examples, the system controller is further configured to receive third location information indicating that the haul truck has arrived at the worksite, generate third instructions which, when executed by the electronic device, cause the electronic device to update the location of the visual indicia on the map and change the characteristic of the visual indicia to indicate that the haul truck has arrived at the worksite, and provide the third instructions to the electronic device via the network.

In a further example of the present disclosure, a system includes one or more processors, and non-transitory computer-readable media storing computer-executable instructions that, when executed by the one or more processors, cause the one or more processors to perform operations. In such examples, the operations include receiving, from a project management system, first information associated with a first vehicle, where the first information indicates a first location of the first vehicle, a first project associated with the first vehicle, and a first state associated with the first vehicle. Additionally, in such examples, the operations include receiving, from the project management system, second information associated with a second vehicle, the second information indicating a second location of the second vehicle, a second project associated with the second vehicle, and a second state associated with the second vehicle. In such examples, the operations further include determining a first characteristic of a first visual indicia to display on a map in a user interface based on the first information, and determining a second characteristic of a second visual indicia to display on the map in the user interface based on the second information, where the second characteristic is different from the first characteristic. In such examples, the operations further include outputting the user interface on a device associated with a user, where the user interface displays the map, the first visual indicia, and the second visual indicia.

DETAILED DESCRIPTION

Figure 1:
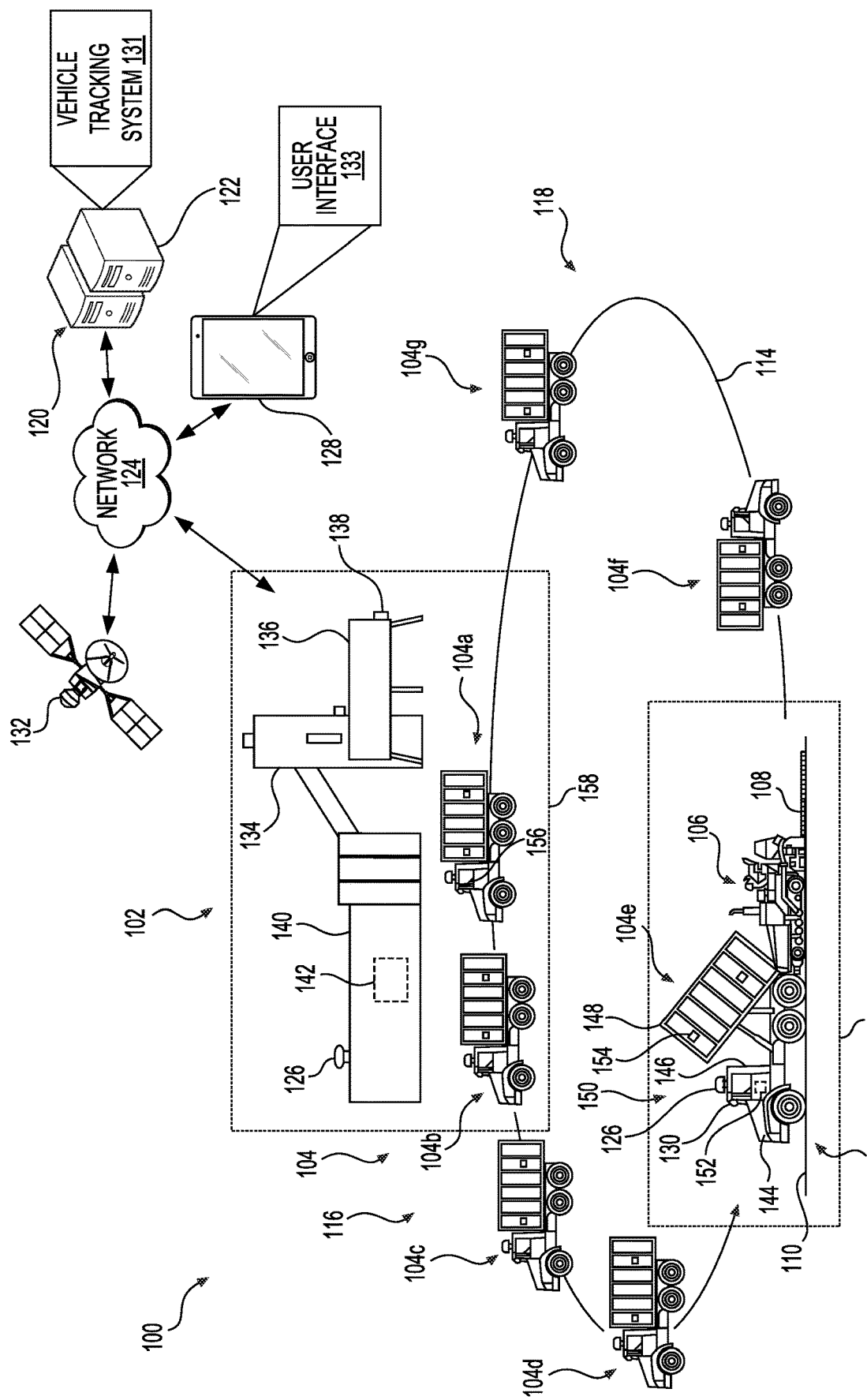
FIG. 1 is a schematic illustration of an example vehicle tracking system of the present disclosure.

Wherever possible, the same reference numbers will be used throughout the drawings to refer to the same or like parts. Referring to FIG. 1, an example of a paving system 100 includes one or more paving material plants 102, and a plurality of machines such as one or more haul trucks 104 and/or one or more paving machines 106. For example, the paving material plant 102 includes various equipment configured to heat, produce, sense, store, and/or transfer paving material 108 such as asphalt (or other material). For instance, one or more haul trucks 104 are loaded with a desired amount of paving material 108 at the paving material plant 102, and the haul trucks 104 deliver the paving material 108 to the paving machine 106. The paving machine 106 deposits the paving material 108 onto a work surface 110 of a worksite 112. In any of the examples described herein, the one or more haul trucks 104 are configured to travel along at least one travel path 114 extending from the paving material plant 102 to the worksite 112. Such a travel path 114 may include one or more partially or completely formed roads, highways, bridges, service roads, or other surfaces passable by construction and/or paving machines. Such an example worksite 112 includes, for example, a construction site, a road work site, a parking lot, or any other type of job site. Once the one or more haul trucks 104 have delivered the paving material 108 to the worksite 112, the haul trucks 104 transfer the paving material 108 to a hopper or other component of the paving machine 106, and the paving machines 106 applies the paving material 108 to and/or otherwise deposit the paving material 108 on the work surface 110.

As shown in FIG. 1, an example paving system 100 includes a first haul truck 104a, a second haul truck 104b, a third haul truck 104c, a fourth haul truck 104d, a fifth haul truck 104e, a sixth haul truck 104f, a seventh haul truck 104g (collectively, referred to herein as "haul trucks 104"), and/or one or more additional haul trucks (not shown). In examples, the paving system 100 may include greater than or less than the seven haul trucks 104 shown in FIG. 1. Further, as shown in FIG. 1, the haul trucks 104 travel sequentially (e.g., one after another), along the travel path 114, from the paving material plant 102 to the worksite 112, and sequentially return to the paving material plant 102 along substantially the same travel path 114 or along a separate (e.g., different) travel path 114. For example, the haul trucks 104 deliver paving material 108 to the worksite 112 by sequentially traversing a first portion 116 of the travel path 114 extending from the paving material plant 102 to the worksite 112, and return to the paving material plant 102 by sequentially traversing a second portion 118 of the travel path 114 extending from the worksite 112 to the paving material plant 102 (or other location).

Additionally, although not illustrated in FIG. 1, it is understood that the paving system 100 may further include one or more other worksites and/or paving material plants (not pictured) than the worksite 112 and the paving material plant 102. In some examples, the haul trucks 104 may travel between different ones of the multiple worksites and/or paving material plants along travel paths that at least partially differ from the travel path 114. Further, in some cases, the haul trucks 104 perform tasks at locations other than the paving material plant 102 and the worksite 112, such as to refuel, perform maintenance operations, load and/or distribute other types of material, and the like.

In examples, the paving material plant 102 produces paving material 108 such as asphalt from bitumen, aggregate, and other materials or fillers. The paving material 108 is often produced in batches with each batch sorted or held in a separate storage or holding location, such as a silo, until it is loaded into one or more haul trucks 104 at a loading station of the paving material plant 102. Each holding location may be dedicated to storing or holding paving material 108 for a particular worksite 112 and paving material 108 within a particular holding location is periodically loaded into one or more haul trucks 104 for transport to a worksite 112. The characteristics of each batch stored within a holding location is set based upon the desired characteristics for a particular paving project. For example, the amount of oil and the size of the aggregate is set based upon the desired characteristics of the paving material 108 and the requirements of each paving project.

The paving system 100 shown in FIG. 1 also includes a control system 120 and one or more system controllers 122. In some examples, the control system 120 and/or the system controller 122 are located at the paving material plant 102. In such examples, the control system 120 and/or the system controller 122 also includes components located remotely from the paving material plant 102 such as on any of the machines of the paving system 100, at the worksite 112, and/or at a remote command center (not shown). In some examples, the control system 120 and/or the system controller 122 are located remote from the paving material plant 102 and/or remote from the worksite 112, such as at the remote commend center referred to above. In any of the examples described herein, the functionality of the system controller 122 may be distributed so that certain operations are performed at the paving material plant 102 and other operations are performed remotely. For example, some operations of the system controller 122 are performed at the worksite 112, on one or more of the haul trucks 104, on one or more of the paving machines 106, etc. It is understood that the system controller may comprise a component of the paving system 100, the paving material plant 102, one or more of the haul trucks 104, one or more of the paving machines 106, a component of a separate electronic device (e.g., a mobile phone, a tablet, a laptop computer, etc.), and/or the control system 120. As described in more detail below, the control system 120 and/or components of the control system 120 are used to track the locations of the haul trucks 104 and provide a user interface indicating the locations, along with states of the haul trucks 104 that represent a project association of the respective haul trucks 104, tasks being performed by the respective haul trucks 104, and so forth.

The system controller 122 is an electronic controller that operates in a logical fashion to perform operations, execute algorithms, store and retrieve data and/or other desired operations. The system controller 122 includes or accesses memory, secondary storage devices, processors, and any other components for running an application. The memory and secondary storage devices may be in the form of read-only memory (ROM) or random-access memory (RAM) or integrated circuitry that is accessible by the controller. Various other circuits may be associated with the system controller 122 such as power supply circuitry, signal conditioning circuitry, driver circuitry, and/or other types of circuitry.

The system controller 122 may be a single controller or may include more than one controller (such as additional controllers associated with each of the haul trucks 104, paving machines 106, compaction machines (not shown), and/or other machines/components of the paving system 100) configured to control various functions and/or features of the paving system 100. As used herein, the term "controller" is meant in its broadest sense to include one or more controllers, processors, central processing units, and/or microprocessors that are associated with the paving system 100, and that may cooperate in controlling various functions and operations of the paving material plant 102 and the machines of the paving system 100. The functionality of the system controller 122 may be implemented in hardware and/or software without regard to the functionality. The system controller 122 may rely on one or more data maps, look-up tables, neural networks, algorithms, machine learning algorithms, data layers, predictive layers, and/or other components relating to the operating conditions and the operating environment of the paving system 100 that are stored in the memory of the system controller 122. Each of the data maps noted above may include a collection of data in the form of tables, graphs, and/or equations to maximize the performance and efficiency of the paving system 100 and its operation.

The components of the control system 120 are in communication with and/or otherwise operably connected to any of the components of the paving system 100 via a network 124. The network 124 may be a local area network ("LAN"), a larger network such as a wide area network ("WAN"), or a collection of networks, such as the Internet. Protocols for network communication, such as TCP/IP, may be used to implement the network 124. Although embodiments are described herein as using a network 124 such as the Internet, other distribution techniques may be implemented that transmit information via memory cards, flash memory, or other portable memory devices.

It is also understood that the paving material plant 102, the various haul trucks 104, paving machines 106, electronic devices operable by one or more users, and/or other components of the paving system 100 may include respective controllers, and each of the respective controllers are in communication and/or are otherwise be operably connected via the network 124. For example, the network 124 comprises a component of a wireless communication system of the paving system 100, and as part of such a wireless communication system, the paving material plant 102, the one or more haul trucks 104, the paving machine 106, the electronic devices operable by one or more users and/or other components of the paving system 100 include respective communication devices 126. Such communication devices 126 are configured to permit wireless transmission of a plurality of signals, instructions, and/or information between the paving material plant 102, the haul trucks 104, the paving machines 106, the compaction machines, and the system controller 122, as well as to permit communication with other machines and systems remote from the paving material plant 102, haul trucks 104, paving machines 106, and/or the worksite 112. For example, such communication devices 126 include a transmitter configured to transmit signals to a receiver of one or more other such communication devices 126. In such examples, each communication device 126 also includes a receiver configured to receive such signals. In some examples, the transmitter and the receiver of a particular communication device 126 are combined as a transceiver or other such component. In any of the examples described herein, such communication devices 126 also enable communication with one or more tablets, computers, cellular/wireless telephones, personal digital assistants, mobile devices, or other electronic devices 128 located at the worksite 112, at the paving material plant 102, and/or remote from the worksite 112 or the paving material plant 102. Such electronic devices 128 may comprise, for example, mobile phones and/or tablets of project managers (e.g., foremen) overseeing daily operations at the worksite 112, at the paving material plant 102, and/or in surrounding areas.

The network 124, communication devices 126, and/or other components of the wireless communication system described above may implement or utilize any desired system or protocol including any of a plurality of communications standards. The desired protocols will permit communication between the system controller 122, one or more of the communication devices 126, and/or any other desired machines or components of the paving system 100. Examples of wireless communications systems or protocols that may be used by the paving system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications are transmitted and received directly between the control system 120 and a machine (e.g., a paving machine 106, one of the haul trucks 104, etc.) of the paving system 100 or between such machines. In other instances, the communications are automatically routed without the need for re-transmission by remote personnel.

In example embodiments, one or more machines of the paving system 100 (e.g., the one or more haul trucks 104, the paving machine 106, etc.) include a location sensor 130 configured to determine a location and/or orientation of the respective machine. In such embodiments, the communication device 126 of the respective machine is configured to generate and/or transmit signals indicative of such determined locations and/or orientations to, for example, a vehicle tracking system 131 of the system controller 122 and/or to the other respective machines of the paving system 100. In some examples, the location sensors 130 of the respective machines include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein comprise a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, and/or at various time intervals. One or more additional machines of the paving system 100 may also be in communication with the one or more GPS satellites 132 and/or UTS, and such GPS satellites 132 and/or UTS may also be configured to determine respective locations of such additional machines.

In any of the examples described herein, machine locations determined by the respective location sensors 130 are used by the vehicle tracking system 131 of the system controller 122 and/or other components of the paving system 100 to coordinate activities of the haul trucks 104, paving machine 106, and/or other components of the paving system 100. In some examples, the vehicle tracking system 131 generates project information, such as a ticket, for a specific one of the haul trucks 104, which indicates information such as a project that the haul truck is assigned to, the paving material 108 that the haul truck is to be transporting, the worksite 112 that the haul truck is to take the paving material 108 to, a time at which the haul truck is to leave the paving material plant 102, and so forth. The vehicle tracking system 131 uses the information in the ticket and/or the the machine locations described above to determine a state of the haul truck. For example, machine locations determined by the respective location sensors 130 are used by the vehicle tracking system 131 of the system controller 122 and/or other components of the paving system 100 to determine a direction of travel of individual ones of the haul trucks. The vehicle tracking system 131 in turn leverages information included in a ticket to determine a project and/or worksite that the haul truck is assigned to, a material that the haul truck is designated to transport from the paving material plant 102 to the worksite 112, and the like. From these sources of information, the vehicle tracking system 131 makes determinations such as whether the haul truck is traveling to or from the worksite 112 or the paving material plant 102, whether the haul truck is loaded or substantially unloaded, whether the haul truck has reached (or has left) a paving location within the worksite 112, and so forth, as described further herein below. The vehicle tracking system 131 may further leverage this information to streamline transport of the paving material 108, identify impedances in the transport of the paving material 108, and the like.

The system controller 122 and/or other components of the paving system 100 also generate a user interface 133 that includes, among other things, information indicative of the state(s) and/or location(s) of the haul trucks 104 of the paving system 100. The system controller 122 provides the user interface 133 to, for example, the electronic device 128, a controller of the paving machine 106, and/or other components of the paving system 100, via the network 124, for display such that operation of the various components of the paving system 100 can be modified and/or otherwise controlled based at least in part the states and/or locations of the haul trucks 104. In examples in which the paving machine 106 and/or other components of the paving system 100 are operating under autonomous or semi-autonomous control, the speed, steering, paving rate, and/or other functions of such components are controlled automatically or semi-automatically based at least in part on the states and/or locations of the haul trucks 104.

With continued reference to FIG. 1, the paving material plant 102 includes various material delivery components, mixers, heaters, and/or other equipment configured to assist in manufacturing paving material 108 for use in various paving operations. Such equipment may include, for example, one or more conveyors or other devices configured to transport paving material 108 to one or more paving material silos 134 or other holding locations for storage therein. The paving material plant 102 also includes one or more load stations 136 configured to transfer paving material 108 from the one or more paving material silos 134 to the one or more haul trucks 104. Similarly, the load station 136 includes one or more sensors 138 configured to determine the presence and/or location of one or more haul trucks 104 (e.g., the haul truck 104a shown in FIG. 1), a time at which the haul truck 104a arrived at the load station 136, a time at which the haul truck 104a departed the load station 136, an amount (e.g., a weight) of paving material 108 loaded into the haul truck 104a, and/or other information associated with the haul truck 104a. In some examples, the sensor 138 comprises a scale or other mass sensor configured to determine the weight of the haul truck 104a upon entering the load station 136, the weight of the haul truck 104a after paving material has been loaded into the haul truck 104a, and/or a change in weight of the haul truck 104a.

The paving material plant 102 also includes one or more scale houses, operator stations, or other stations 140 for use by paving material plant personnel. For example, as shown in phantom in FIG. 1, one or more such stations 140 includes a paving material plant controller 142 that is substantially similar to and/or the same as the system controller 122 described above. In some examples, the paving material plant controller 142 comprises a component of the control system 120. In any of the examples described herein, the paving material plant controller 142 and/or other components of the paving material plant 102 are configured to monitor, record, and/or communicate activities of the various haul trucks 104 entering and leaving the paving material plant 102. For example, the various sensors of the paving material plant 102 and/or the paving material plant controller 142 monitor, sense, determine, record, and/or transmit information indicative of a project associated with a particular haul truck 104a, a time at which the particular haul truck 104a enters the paving material plant 102, a time at which the haul truck 104a leaves the paving material plant 102, the amount of paving material 108 loaded into the particular departing haul truck 104a, the destination of the particular haul truck 104a (e.g., the location of the worksite 112) the operator of the haul truck 104a, and/or other information. Such information is used by, for example, the system controller 122 in any of the state determinations, location determinations, and/or other operations described herein.

In some examples, further information associated with a haul truck 104a is collected while the particular haul truck 104a is disposed at the paving material plant 102. For instance, each of the haul trucks 104 may have a unique license plate number, a unique truck identification number, a radio frequency identification (RFID) tag, and/or other haul truck identifier that is unique to the respective haul truck 104a. In such examples, a haul truck identifier unique to the respective haul truck 104a is scanned, observed, and/or otherwise determined by the sensor 138 while the haul truck 104a is disposed at the load station 136. Additionally, and/or alternatively, the haul truck identifier unique to the respective haul truck 104a is scanned, observed, and/or otherwise determined by one or more sensors (not shown) associated with the station 140 when the haul truck 104a is disposed at the station 140. Additionally, and/or alternatively, paving material plant personnel may scan, observe, and/or otherwise determine the haul truck identifier unique to the respective haul truck 104a using one or more hand-held scanners, sensors, or other devices when the haul truck 104a is disposed at the load station 136, the station 140, and/or at other locations within the paving material plant 102. In any such examples, the sensors, hand-held scanners, or other devices described above provide the determined haul truck identifier to the paving material plant controller 142, together with a time stamp indicating the time at which the haul truck identifier was determined, in one or more signals transmitted via the network 124.

As noted above, the haul trucks 104 of the paving system 100 are operable to transport paving material 108 between the paving material plant 102 and one or more of the paving machines 106 located at the worksite 112. Each of the haul trucks 104 include a chassis 144 that supports a prime mover, such as an engine, and a cab 146 in which an operator may be positioned to provide input instructions to operate the haul trucks 104. The engine is operatively connected to and drives a ground engaging drive mechanism such as wheels. A material transport unit such as a dump body 148 is pivotally mounted on the chassis 144 and receives a payload (e.g., paving material 108) to be hauled from one location to another.

Each of the haul trucks 104 includes a truck control system 150 and a truck controller 152 generally similar or identical to the control system 120 and the system controller 122, respectively. The truck control system 150 and the truck controller 152 are located on a respective one of the haul trucks 104 and may also include components located remotely from the respective one of the haul trucks 104 such as on any of the other machines of the paving system 100, at the paving material plant 102, or at a command center (not shown). The functionality of truck controller 152 may be distributed so that certain functions are performed on the respective one of the haul trucks 104 and other functions are performed remotely. In some examples, the truck control system 150 and/or the truck controller 152 enable autonomous and/or semi-autonomous control of the respective one of the haul trucks 104.

The haul trucks 104 are also equipped with a plurality of sensors connected to and/or otherwise in communication with the truck controller 152 and/or with the system controller 122. Such sensors are configured to provide data indicative (directly or indirectly) of various operating parameters of the respective one of the haul trucks 104, systems associated with the respective one of the haul trucks 104, and/or the worksite 112 and/or other environment in which the respective one of the haul trucks 104 is operating. In any of the examples described herein, such sensors comprise components of the truck control system 150, the control system 120, and/or the paving system 100, generally. For example, as noted above, each of the haul trucks 104 are equipped with a location sensor 130 configured to sense, detect, and/or otherwise determine a location and/or orientation of a respective one of the haul trucks 104. The location sensor 130 includes a plurality of individual sensors that cooperate to generate and provide location signals to the truck controller 152 and/or to the system controller 122 indicative of the location and/or orientation of a respective one of the haul trucks 104. In some examples, the location sensor 130 is fixed to the cab 146, the chassis 144, and/or any other component of one of the haul trucks 104. In other examples, however, the location sensor 130 may be removably attached to a respective one of the haul trucks 104 and/or disposed within, for example, the cab 146 of a haul truck 104a during operation of the haul truck 104a. In some examples, each of the haul trucks 104 also includes a load sensor 154 configured to sense, measure, and/or otherwise determine the load or amount of paving material 108 disposed within the dump body 148.

With continued reference to FIG. 1, the haul trucks 104 include a display 156, such as an LCD display, which in some examples is communicatively coupled to the truck controller 152. The display 156 may be mounted on an interior and/or on an exterior of the haul trucks 104 for viewing by an operator. In some examples, the display 156 is disposed within the cab 146 and is configured to display the user interface 133 described above. As will be described below, an example user interface 133 may include, among other things, visual indicia of the paving material plant 102, visual indicia of the worksite 112, visual indicia associated with one or more of the respective haul trucks 104, and so forth. In some examples, the visual indicia associated with the one or more haul trucks has characteristics that associate the various haul trucks 104 with different projects, locations of the haul trucks 104, tasks being completed by the haul trucks 104, materials being transported by the haul trucks 104, and the like.

In examples, the user interface 133 includes a map of the worksite 112 including icons or other visual indicia representing the work surface 110, the paving machine 106, one or more of the haul trucks 104, and/or other components of the paving system 100. The user interface 133 also includes a map of the area surrounding the worksite 112. For instance, such a map may include lines, icons, markers, or other visual indicia representing the paving material plant 102, the worksite 112, the travel path 114 extending from the paving material plant 102 to the worksite 112, one or more of the haul trucks 104 disposed on the travel path 114, one or more additional roads, or other items. In some examples, the visual indicia representing the paving material plant 102, the worksite 112, a paving location within the worksite 112, or other landmarks correspond to a geofence defining a boundary associated with the landmark. A geofence is a virtual perimeter for a real-world geographic area, and in some cases, may have a predefined set of boundaries corresponding to the geographic area. In the paving system 100, a geofence 158 defines a boundary associated with the paving material plant 102, and a geofence 160 defines a boundary associated with the worksite 112.

In some examples, the vehicle tracking system 131 compares the location data received from the haul trucks 104 to a location of the geofence 158 and/or the geofence 160 to determine states of individual ones of the haul trucks 104. In an illustrative example, the vehicle tracking system 131 receives location information indicating that the haul truck 104a has passed the location of the geofence 158, and thus determines that the haul truck 104a has departed the paving material plant 102. Based on this determination, the vehicle tracking system 131 generates and provides an instruction to the electronic device 128 to update a location of a visual indicia corresponding to the haul truck 104a on a map displayed in the user interface 133, and to change a characteristic of the visual indicia to indicate that the haul truck 104a has departed the paving material plant 102. In some examples, the instruction causes the visual indicia displayed in the user interface 133 and representing the haul truck 104a to change a shade of a color of the visual indicia, such as from a first shade of blue to a second shade of blue. Subsequently in the illustrative example, the vehicle tracking system 131 receives location information indicating that the haul truck 104a has passed the location of the geofence 160, and thus determines that the haul truck 104a has arrived at the worksite 112. Based on this determination, the vehicle tracking system 131 generates and provides an instruction to the electronic device 128 to update a location of a visual indicia corresponding to the haul truck 104a on a map displayed in the user interface 133, and to change the characteristic of the visual indicia to indicate that the haul truck 104a has arrived at the worksite 112. For instance, the instruction causes the visual indicia displayed in the user interface 133 and representing the haul truck 104a to change the shade of the color of the visual indicia, such as from the second shade of blue to a third shade of blue.

Similarly, the vehicle tracking system 131 compares the location information received from the haul truck 104a to the geofence 158 and/or the geofence 160 to determine whether the haul truck 104a is returning to the paving material plant 102. For example, the vehicle tracking system 131 receives location information indicating that the haul truck 104a has again passed the location of the geofence 160, and thus determine that the haul truck 104a has departed the worksite 112. Based on this determination, the vehicle tracking system 131 generates and provides an instruction to the electronic device 128 to update the location of the visual indicia corresponding to the haul truck 104a on the map displayed in the user interface 133, and to change the characteristic of the visual indicia to indicate that the haul truck 104a has departed the worksite 112. For instance, the instruction causes the visual indicia displayed in the user interface 133 and representing the haul truck 104a to change the shade of the color of the visual indicia, such as from the third shade of blue to a fourth shade of blue. Subsequently in the illustrative example, the vehicle tracking system 131 receives location information indicating that the haul truck 104a has again passed the location of the geofence 158, and thus determine that the haul truck 104a has returned to the paving material plant 102. Based on this determination, the vehicle tracking system 131 generates and provides an instruction to the electronic device 128 to update the location of the visual indicia corresponding to the haul truck 104a on the map displayed in the user interface 133, and to change the characteristic of the visual indicia to indicate that the haul truck 104a has returned to the paving material plant 102. For instance, the instruction causes the visual indicia displayed in the user interface 133 and representing the haul truck 104a to change the shade of the color of the visual indicia, such as from the fourth shade of blue to a fifth shade of blue. The vehicle tracking system 131 may perform similar operations for a paving location within the worksite using a geofence location associated with the paving location, if present.

In some cases, the user interface 133 includes information associated with a respective one of the haul trucks 104, paving material information, and/or other information typically included in a paving ticket generated at the paving material plant 102. Further, it is understood that such user interfaces 133 may be displayed via a display of one or more of the haul trucks 104, the electronic device 128, and/or via any other displays associated with the system controller 122, the paving material plant controller 142, or other components of the control system 120. For example, the user interface 133 displays different ones of the haul trucks 104 associated with different projects or worksites using different colors for the visual indicia based on which project or worksite the respective haul trucks are associated with. Additionally, the user interface 133 changes a characteristic of the visual indicia to represent a state of the respective ones of the haul trucks 104 based on states of the haul trucks, such as different shades of blue for haul trucks associated with a first project having different states, different shades of red for haul trucks associated with a second project having different states, and so forth.

Figure 2:
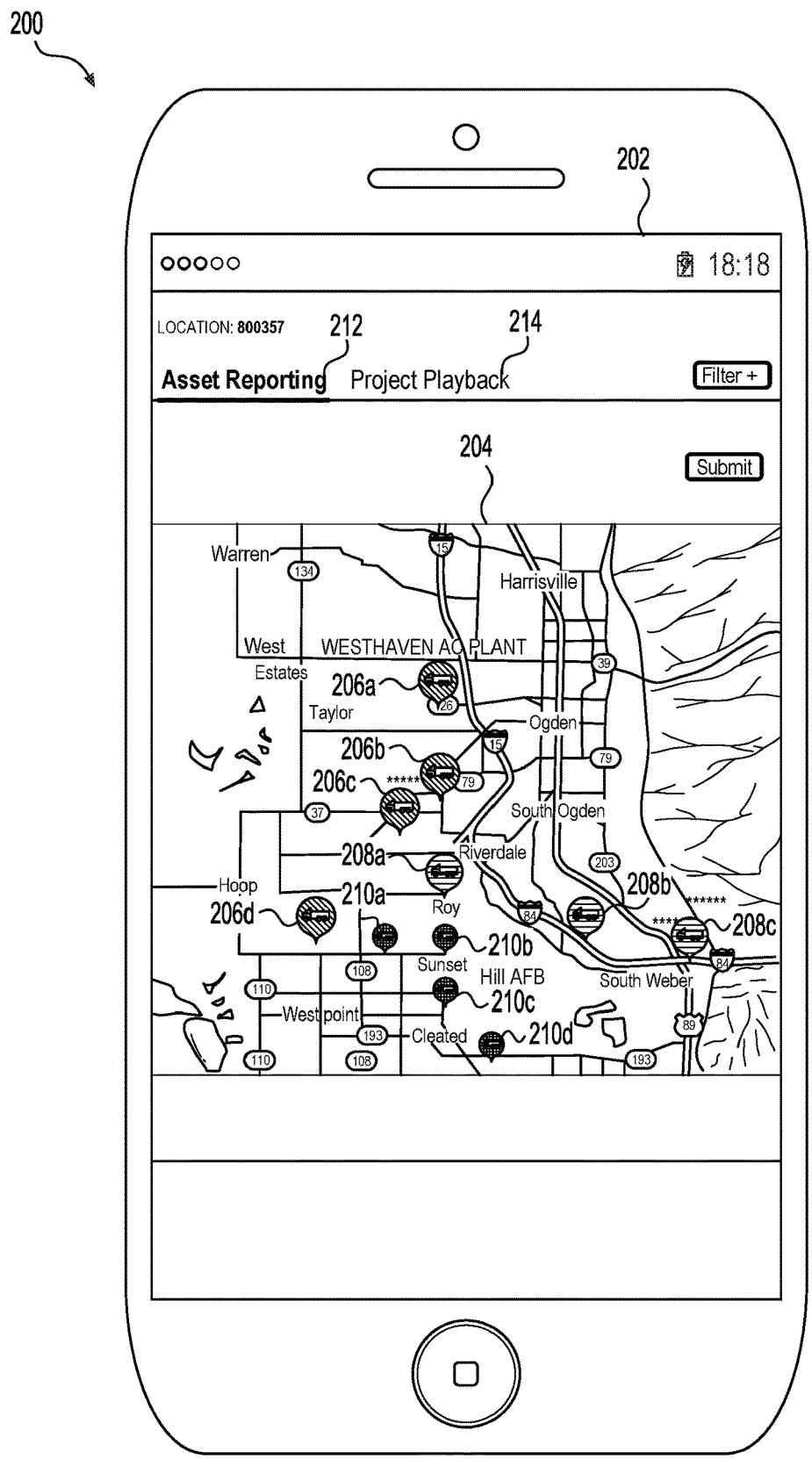
FIG. 2 is an illustration of an example user interface generated by the vehicle tracking system shown in FIG. 1.

FIG. 2 is an illustration of an example user interface 200 generated by the vehicle tracking system 131 shown in FIG. 1. The example user interface 200 may comprise any of the user interfaces 133 described above with respect to FIG. 1, and the user interface 200 of FIG. 2 is shown as being displayed on an LCD display, a CRT display, a touch-screen (e.g., a capacitive/touch-sensitive) display device, and/or other display 202. In some examples, the display 202 comprises a display of the electronic device 128, a display associated with the system controller 122, a display associated with the paving material plant controller 142, and/or a display associated with one or more other components of the control system 120. In further examples, the display 202 comprises a display of one or more of the haul trucks 104 as described above with respect to FIG. 1.

As shown in FIG. 2, the example user interface 200 includes information indicative of vehicle states and locations for one or more paving projects displayed on a map 204. In some examples, the example user interface 200 includes visual indicia 206a, 206b, 206c, and 206d (collectively, "visual indicia 206") that correspond to individual haul trucks (or other vehicle types) associated with a particular project or worksite. For instance, the visual indicia 206 represents an association of the haul trucks with the particular project by a shared characteristic of the multiple visual indicia 206, such as a same color (represented here by a same diagonal hatching).

Additionally, the example user interface 200 includes visual indicia 208a, 208b, and 208c (collectively, "visual indicia 208") that correspond to individual haul trucks (or other vehicle types) associated with a particular project or worksite, different from the particular project or worksite associated with the haul trucks represented by the visual indicia 206. To visually represent the different project, the visual indicia 208 is displayed having a different shared characteristic than the characteristic shared between the visual indicia 206. For instance, the visual indicia 208 represents an association of the haul trucks with the different particular project using a shared characteristic of a same color that is different from the color of the visual indicia 206 (represented here by a same horizontal hatching).

Further, the example user interface 200 includes visual indicia 210a, 210b, 210c, and 210d (collectively, "visual indicia 210") that correspond to individual haul trucks (or other vehicle types) associated with a particular project or worksite. In examples, particular project or worksite that the haul trucks represented by the visual indicia 210 is different from the particular project or worksite associated with the haul trucks represented by the visual indicia 206 and the haul trucks represented by the visual indicia 208. To visually represent the different project, the visual indicia 210 is displayed having a different shared characteristic than the characteristic shared between the visual indicia 206, and/or the characteristic shared between the visual indicia 208. For instance, the visual indicia 210 represents an association of the haul trucks with the different particular project using a shared characteristic of a same color that is different from the color of the visual indicia 206 and/or different from the visual indicia 208 (represented here by a same cross-hatching). By displaying the visual indicia 206, the visual indicia 208, and the visual indicia 210 using different characteristics (such as color) to indicate association of vehicles with a particular project, the example user interface 200 enables a foreman or other personnel to determine project impedances and/or projects that are progressing efficiently. Such information may be used by the system controller 122 or the foreman to reallocate resources, including vehicles, according to project demands.

Although not explicitly pictured in the example user interface 200, haul trucks or other vehicles that are not associated with a particular project or worksite may be represented on the map 204 in the example user interface 200 with visual indicia as well. Such visual indicia representing haul trucks or vehicles that are not associated with a particular project may have a different shared characteristic than the characteristic shared between the visual indicia 206, the characteristic shared between the visual indicia 208, and/or the characteristic shared between the visual indicia 210. The shared characteristic to represent haul trucks or vehicles that are not associated with a particular project may be a same color that is different from the color of the visual indicia 206, the color of the visual indicia 208, and/or the color of the visual indicia 210, for instance. In this way, a foreman or other personnel may quickly determine a number and location of vehicles that are not associated with a particular project, which in turn may be used to assign more vehicles to a project to increase project efficiency.

In examples, the visual indicia 206, the visual indicia 208, and/or the visual indicia 210 are depicted on the map 204 in the example user interface 200 at a location corresponding to location data received from the haul trucks 104 as described in relation to FIG. 1. In some cases, the example user interface 200 includes selectable controls that enable real time (or substantially real time, as based on transmission time and processing of location data to be displayed in the example user interface) display or a playback of the visual indicia 206, the visual indicia 208, and/or the visual indicia 210. For instance, selection of a selectable control 212 ("Asset Reporting") displays visual indicia 206, the visual indicia 208, and/or the visual indicia 210 on the map 204 in the example user interface 200 in real time. Additionally, selection of a selectable control 214 ("Project Playback") displays visual indicia 206, the visual indicia 208, and/or the visual indicia 210 on the map 204 in the example user interface 200 from a previous period of time, which is discussed in more detail in relation to FIG. 3. The visual indicia shown in the example user interface 200 are intended only as examples, and other visual indicia are also contemplated as being depicted in a user interface, such as paving material plants, worksites, paving locations, refueling stations, geofences, and so forth.

Figure 3:
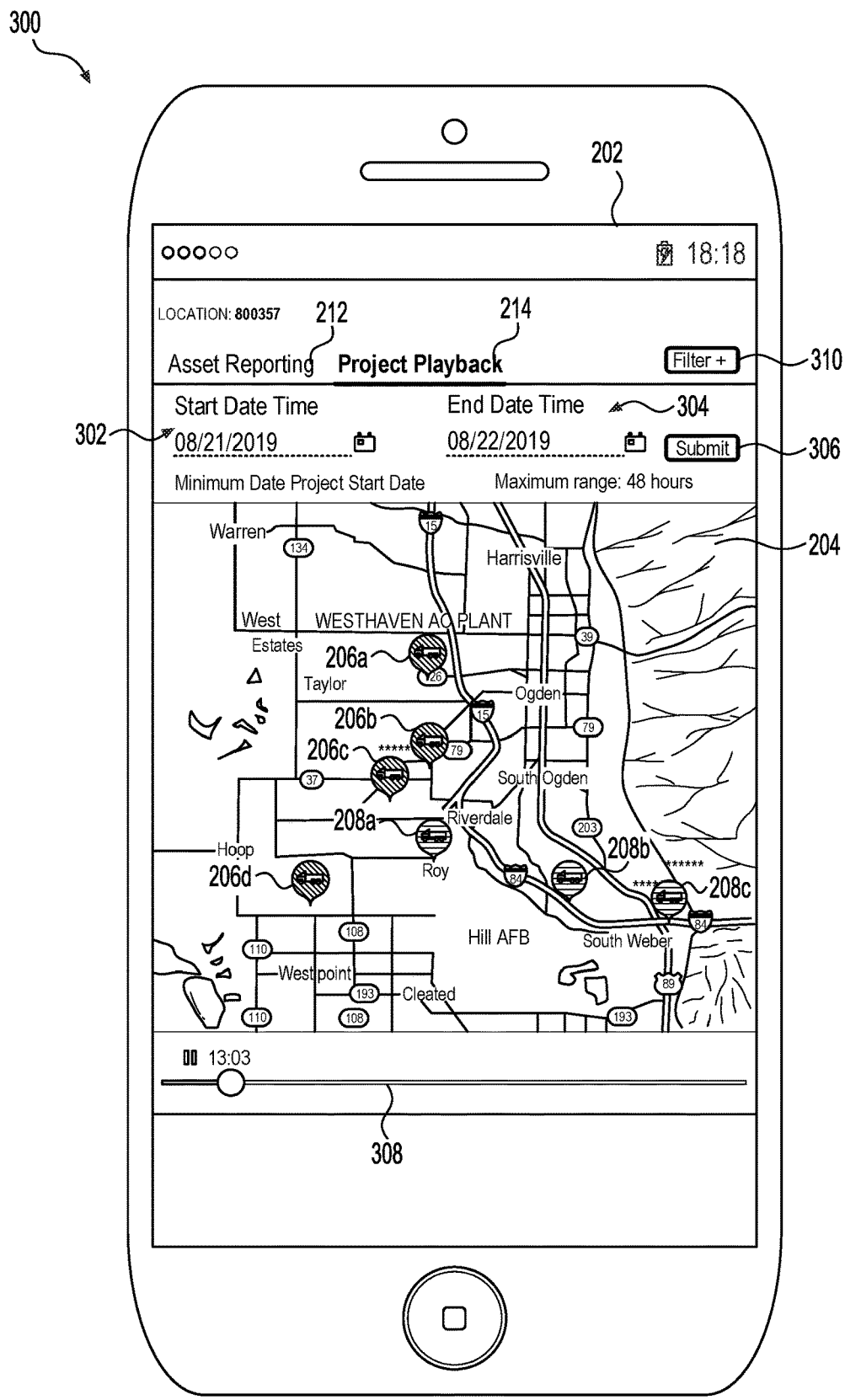
FIG. 3 is an illustration of another example user interface generated by the vehicle tracking system shown in FIG. 1.

FIG. 3 is an illustration of another example user interface 300 generated by the vehicle tracking system 131 shown in FIG. 1 and provided by the display 202. In some examples, the example user interface 300 is provided by the display 202 at least partially in response to selection of the selectable control 214 corresponding to Project Playback. The example user interface 300 includes an input field 302, which enables a user to input a start date and/or start time for a recording of a project to be played in the example user interface 300. Similarly, the example user interface 300 includes an input field 304, which enables a user to input an end date and/or end time for a recording of the project to be played in the example user interface 300. Accordingly, upon selection of a selectable control 306 ("Submit"), a playback of visual indicia, including locations and changing characteristics (e.g., associated with changing projects, tasks, loaded/unloaded, material type being hauled, and the like as described in more detail in relation to FIG. 4) are displayed accordingly on the map 204 depicted in the example user interface 300. The example user interface 300 includes a progress indicator 308 that illustrates an amount of time played and/or an amount of time remaining in the playback. In some cases, playback of the amount of time selected for the project via the selectable input field 302 and the input field 304 may be accelerated (e.g., 2× speed, 5× speed, 10× speed, etc.) for playback in the example user interface 300.

Additionally, in some examples, the example user interface 300 includes a selectable control 310 ("Filter +") which, when selected, enables a user to filer which visual indicia are displayed on the map 204 during the playback, such as based on a state of individual ones of the haul trucks 104. For instance, as illustrated in the example user interface 300, a user has used the selectable control 310 to include visual indicia representing haul trucks associated with two of the three projects described in relation to FIG. 2 in the playback. The vehicle tracking system 131 and/or the electronic device 128 determines, based on tickets, locations, or other information associated with the haul trucks 104, which of the haul trucks 104 are associated with the state selected by the user using the selectable control 310. Based on these determinations, the visual indicia 206 and the visual indicia 208 are illustrated on the map 204 during the playback, while the visual indicia 210 are omitted from the playback. While the description of filtering which of the haul trucks 104 or other vehicles are described in relation to playback of a recording, examples are considered in which filtering of which vehicles are displayed in real time are considered as well (e.g., in relation to FIG. 2).

In addition to filtering which of the haul trucks 104 or other vehicles are displayed based on project, the vehicle tracking system 131 and/or the electronic device 128 may also filter which vehicles are displayed based on other state information as well. For instance, the selectable control 310 enables the user to filter which vehicles are displayed based on whether the vehicles are loaded or substantially unloaded, a material type being hauled by the vehicles, a task being performed by the vehicles, among others. In some examples, the selectable control 310 enables the user to select more than one filter to apply to the playback (or real time display) at a time, such as a material type and a particular project. In this example, vehicles hauling the selected material type and associated with a particular project will be displayed in the playback, while vehicles that are not hauling the selected material type or are associated with the particular project will be removed from the playback. Of course, other vehicle state combination selections are also considered. A non-limiting description of vehicle states that can be selected to filter vehicles displayed using visual indicia in the example user interface 200 and/or the example user interface 300 can be found in the description of FIG. 4.

Figure 4:
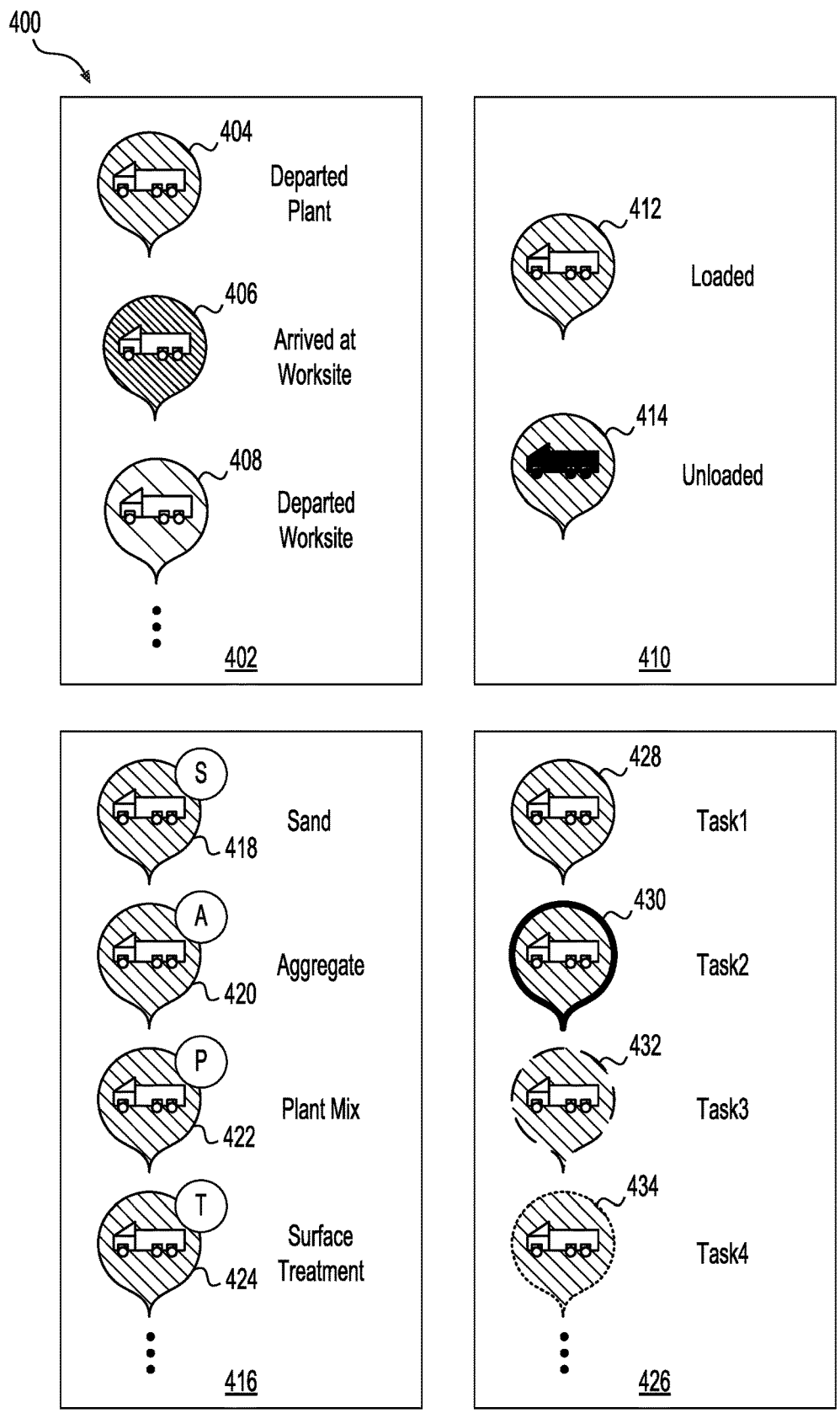
FIG. 4 is an illustration of different icons that may be generated by the vehicle tracking system shown in FIG. 1 to generate a user interface.

FIG. 4 is an illustration of different icons 400 that may be used by the vehicle tracking system 131 shown in FIG. 1 to generate the user interface 200 and/or the user interface 300. As discussed above and below, the visual indicia 206, the visual indicia 208, and/or the visual indicia 210 have a characteristic, such as a color of the visual indicia, which corresponds to a project or worksite 112 that individual ones of the haul trucks 104 represented by the visual indicia are associated with. In addition to the color associated with a particular project, in some cases individual ones of the visual indicia 206, the visual indicia 208, and/or the visual indicia 210 may have one or more characteristics that correspond to a state of the individual ones of the haul trucks 104 represented by the visual indicia. The characteristics may provide a foreman or other personnel viewing the user interface 200 and/or the user interface 300 with easily-identifiable indications of a state of the haul trucks 104 as the haul trucks 104 perform tasks for their respective projects or worksites. While reference is made in the description of the different icons 400 to the haul truck 104a and a corresponding visual indicia 206a as an illustrative example, any of the haul trucks 104 or other vehicles, along with any of the visual indicia representing correspondence with different projects, are also considered.

For example, a group of icons 402 has variations of a characteristic representing a location of a haul truck 104a, such as relative to one or more geofences. The group of icons 402 illustrate variations of a characteristic of the visual indicia 206a. In some examples, the vehicle tracking system 131 compares location information received from the haul truck 104a to a known location of a geofence 158 and/or a geofence 160, such as to determine whether the haul truck 104a has arrived at or departed from a location such as the paving material plant 102 or the worksite 112. For instance, a visual indicia 404 may correspond to the haul truck 104a departing the paving material plant 102 (e.g., passing the geofence 158), a visual indicia 406 may correspond to the haul truck 104a arriving at the worksite 112 (e.g., passing the geofence 160), a visual indicia 408 may correspond to the haul truck 104a departing the worksite 112 (e.g., again passing the geofence 160), and so forth. In the illustrated example, variations in density of the hatched lines between the visual indicia 404, the visual indicia 406, and the visual indicia 408 correspond to different shades of a same color (as represented by a same direction of the hatched lines), to indicate an association with a same project as the haul truck 104a travels to different locations associated with the same project. Other characteristics may also be used to represent the location of the haul truck 104a using the visual indicia 206a.

A group of icons 410 has variations of a characteristic representing whether the haul truck 104a is loaded with material, or is substantially unloaded. The group of icons 410 illustrate variations of a characteristic of the visual indicia 206a. In some examples, the vehicle tracking system 131 may receive information from the load sensor 154 disposed on the haul truck 104a indicating an amount of material currently in the dump body 148. If the information received from the load sensor 154 indicates that the dump body 148 of the haul truck 104a is loaded with material, a visual indicia 412 may be displayed in the user interface 200 and/or the user interface 300 having a full indicator indicating that the haul truck 104a is loaded by a truck outline. If the information received from the load sensor 154 indicates that the dump body 148 of the haul truck 104a is substantially unloaded with material, a visual indicia 414 may be displayed in the user interface 200 and/or the user interface 300 having an empty indicator indicating that the haul truck 104a is substantially unloaded by a filled truck shape. Other characteristics may also be used to represent whether the haul truck 104a is loaded or substantially unloaded using the visual indicia 206a.

In some examples, a group of icons 416 has variations of a characteristic representing a type of material being hauled by the haul truck 104a. The group of icons 416 illustrate variations of a characteristic of the visual indicia 206a. In examples, the vehicle tracking system 131 receives information from the load sensor 154 disposed on the haul truck 104a indicating a type of material currently in the dump body 148. Alternatively or additionally, the vehicle tracking system 131 determines a type of material being transported by the haul truck 104a based on information included in a ticket generated for the haul truck 104a, as described above.

For instance, a visual indicia 418 may include an overlay icon ("S") corresponding to sand material being transported by the haul truck 104a, a visual indicia 420 may include an overlay icon ("A") corresponding to aggregate material being transported by the haul truck 104a, a visual indicia 422 may include an overlay icon ("P") corresponding to plant mix material being transported by the haul truck 104a, a visual indicia 424 may include an overlay icon ("T") corresponding to surface treatment material being transported by the haul truck 104a, and so forth. Other characteristics may also be used to represent the material being transported by the haul truck 104a using the visual indicia 206a.

Additionally, a group of icons 426 has variations of a characteristic representing a task being performed by the haul truck 104a. The group of icons 426 illustrate variations of a characteristic of the visual indicia 206a. In some examples, the vehicle tracking system 131 determines a task being performed by the haul truck 104a based on information included in a ticket generated for the haul truck 104a, and/or based on a location of the haul truck 104a. Some examples of tasks that the group of icons 426 may represent include loading the dump body 148, traveling from the paving material plant 102 to the worksite 112, emptying the dump body 148, traveling from the worksite 112 to the paving material plant 102, refueling, changing operators, and the like. In some examples, a first icon may be used to represent an "on" or "running" condition of a haul truck while a second (different) icon may be used to represent an "off" condition of the haul truck. In any of the examples described herein, a visual indicia 428 may have a default outline corresponding to a task being performed by the haul truck 104a, such as transporting material from the paving material plant 102 to the worksite 112. A visual indicia 430 may have a bold outline corresponding to a task being performed by the haul truck 104a, such as being loaded with material at the paving material plant 102. A visual indicia 432 may have a dashed outline corresponding to a task being performed by the haul truck 104a, such as unloading material to the paving machine 106 at the worksite 112. A visual indicia 434 may have a dotted outline corresponding to a task being performed by the haul truck 104a, such as refueling the haul truck 104a at a refueling station. Other characteristics may also be used to represent the tasks being performed by the haul truck 104a using the visual indicia 206a.

In some examples, the characteristics included one of the various groups of icons 402, 410, 416, and/or 426 may be combined with other characteristics. For example, the shade of the visual indicia 408 indicating that the haul truck 104a has departed the worksite 112 may be combined with the visual indicia 414 indicating that the haul truck 104a is substantially unloaded. In another example, the shade of the visual indicia 404 indicating that the haul truck 104a has departed the paving material plant may be combined with the visual indicia 412 indicating that the haul truck 104a is loaded, and/or with the visual indicia 422 including the overlay icon indicating that the haul truck 104a is loaded with plant mix. Other combinations of characteristics are also considered.

Figure 5:
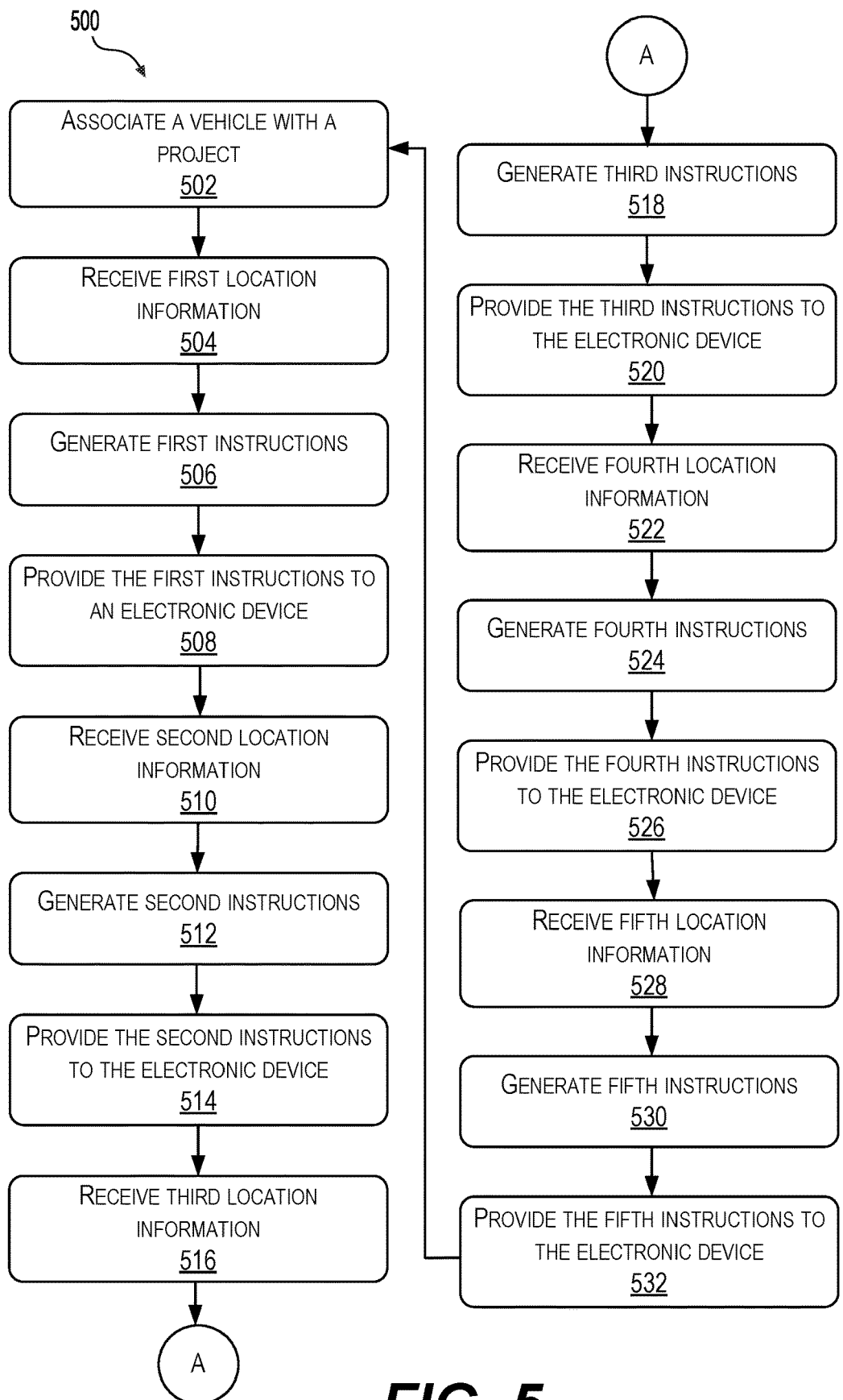
FIG. 5 is a flow chart depicting an example method of determining locations and tracking progress of vehicles by the vehicle tracking system shown in FIG. 1.

FIG. 5 illustrates a flow chart depicting an example method 500 of tracking locations and states of vehicles, such as the haul trucks 104, associated with one or more projects. The example method 500 is illustrated as a collection of steps in a logical flow diagram, which represents operations that may be implemented in hardware, software, or a combination thereof. In the context of software, the steps represent computer-executable instructions stored in memory. When such instructions are executed by, for example, the system controller 122, such instructions may cause the system controller 122, various components of the control system 120, the paving material plant controller 142, the truck controller 152, and/or other components of the paving system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process, and/or with any of the operations described in relation to the method of FIG. 6. For discussion purposes, and unless otherwise specified, the method 500 is described with reference to the paving system 100, the control system 120, the paving material plant 102, the haul trucks 104, and/or other items shown in FIGS. 1-4. In particular, although any part of and/or the entire method 500 may be performed by the truck controller 152, the vehicle tracking system 131, the paving material plant controller 142, the electronic device 128, and/or other components of the paving system 100, unless otherwise specified the method will be described below with respect to the system controller 122 for ease of description.

With reference to FIG. 5, at 502 the system controller 122 associates the vehicle with a project. For example, the vehicle tracking system 131 generates project information, such as tickets, for the haul trucks 104 that provide instructions to the haul trucks 104 about which project individual ones of the haul trucks are assigned to, a material that the respective haul trucks 104 are to transport to the worksite 112, a route to take to the worksite 112, operators assigned to the respective haul trucks 104, and so forth. The system controller 122 uses the information included in the ticket to determine which project the haul truck 104a is assigned to, or otherwise associated with. Alternatively or additionally, the system controller 122 uses location information received from the haul truck 104a to associate the haul truck 104a with the project, such as in coordination with generating the ticket for the haul truck 104a.

At 504, the system controller 122 receives first location information indicating that a vehicle is at a first location. In some examples, the system controller 122 receives the first location information from a haul truck 104a, and compares the first location information to a known location of the geofence 158 associated with the first location, such as the paving material plant 102. Based on the comparison (e.g., based at least in part on determining that the haul truck 104a is inside of a boundary defined by the geofence 158), the system controller 122 determines that the haul truck 104a is at the paving material plant 102. In some cases, the system controller 122 determines that the haul truck 104a has not received a ticket associated with a particular project, in which case the system controller 122 generates and provides instructions to the electronic device 128 that cause the electronic device 128 to display a visual indicia having a characteristic that indicates that the haul truck 104a is not yet associated with a particular project or worksite (e.g., by a specific color, such as gray).

At 506, the system controller 122 generates first instructions which, when executed by the electronic device 128, cause the electronic device 128 to display a user interface 200 comprising a map 204 and visual indicia 206 representing the vehicle being disposed at the first location, where the visual indicia 206 is indicative of the project. In some examples, the user interface 200 displays the first location on the map, such as by displaying the geofence 158 surrounding the paving material plant 102. Accordingly, the user interface 200 depicts the location of the visual indicia 206 on the map 204 inside of the geofence 158 illustrated on the map 204, corresponding to the haul truck 104a being located at the paving material plant 102. The user interface 200 depicts the visual indicia 206 as being associated with the project with a characteristic of the visual indicia 206, such as a color associated with the project. Therefore, each of the one or more of the haul trucks 104 associated with the particular project or worksite 112 has a same color (e.g., blue), to show in the user interface 200 which of the haul trucks 104 are associated with the same project or worksite 112. At 508, the system controller 122 provides the first instructions to the electronic device 128 via the network 124. Alternatively or additionally, the system controller 122 provides the first instructions to the truck controller 152 to display the user interface 133 on the display 156 of the haul truck 104a.

At 510, the system controller 122 receives second location information indicating that the vehicle has departed the first geofence 158 associated with the first location, which may correspond to the paving material plant 102. For example, the system controller 122 receives the second location information from the haul truck 104a, and compare the second location information to the known location of the geofence 158 associated with the first location of the paving material plant 102. Based on the comparison (e.g., determining that the haul truck 104a is currently outside of the boundary defined by the geofence 158), the system controller 122 determines that the haul truck 104a has departed the paving material plant 102. In examples, the system controller 122 continues to receive location information from the haul truck 104a to determine whether the haul truck 104a is progressing along the travel path 114 from the paving material plant 102 to a destination such as the worksite 112, as appropriate.

At 512, the system controller 122 generates second instructions which, when executed by the electronic device 128, cause the electronic device 128 to update a location of the visual indicia 206a on the map 204 and to change a characteristic of the visual indicia 206a to indicate that the vehicle has departed the first geofence 158. In some examples, the user interface 200 depicts the location of the visual indicia 206a on the map 204 outside of the geofence 158 illustrated on the map 204, such as on the travel path 114 to the worksite 112. In some cases, the characteristic of the visual indicia 206a is a shade of the color of the visual indicia 206a, such that the shade changes as responsive to the haul truck 104a departing the geofence 158 associated with the paving material plant 102. In an illustrative example, the visual indicia 206 of each of the haul trucks 104 associated with a particular project and/or the worksite 112 may be red, while a specific one of the visual indicia 206a corresponding to the haul truck 104a may change from a first shade of red to a second shade of red to indicate departure of the haul truck 104a from the paving material plant 102. At 514, the system controller 122 provides the second instructions to the electronic device 128 via the network 124. Similar to the discussion above, the system controller 122 provides the second instructions to the truck controller 152 to display the user interface 133 on the display 156 of the haul truck 104a.

At 516, the system controller 122 receives third location information indicating that the vehicle has arrived at the second geofence 160 associated with the second location, such as the worksite 112. For example, the system controller 122 receives the third location information from the haul truck 104a, and compare the third location information to the known location of the geofence 160 associated with the second location of the worksite 112. Based on the comparison (e.g., determining that the haul truck 104a is currently inside of the boundary defined by the geofence 160), the system controller 122 determines that the haul truck 104a has arrived at the worksite 112. In examples, the system controller 122 continues to receive location information from the haul truck 104a to determine whether the haul truck 104a has entered a boundary of a geofence associated with a paving location of the worksite 112 as well.

At 518 (via "A"), the system controller 122 generates third instructions which, when executed by the electronic device 128, cause the electronic device 128 to update the location of the visual indicia 206a on the map 204 and to change the characteristic of the visual indicia 206a to indicate that the vehicle has arrived at the second geofence 160. In some examples, the user interface 200 depicts the location of the visual indicia 206a on the map 204 inside of the geofence 160 illustrated on the map 204, such as at the worksite 112. As discussed above, the characteristic of the visual indicia 206a may be a shade of the color of the visual indicia 206a, such that the shade changes as responsive to the haul truck 104a entering the geofence 160 associated with the worksite 112. Continuing with the illustrative example above, where the visual indicia 206 of each of the haul trucks 104 associated with a particular project and/or the worksite 112 are red, the specific one of the visual indicia 206a corresponding to the haul truck 104a may change from the second shade of red to a third shade of red to indicate arrival of the haul truck 104a at the worksite 112. At 520, the system controller 122 provides the third instructions to the electronic device 128 via the network 124. Similar to the discussion above, the system controller 122 provides the third instructions to the truck controller 152 to display the user interface 133 on the display 156 of the haul truck 104a.

At 522, the system controller 122 receives fourth location information indicating that the vehicle has departed the second geofence 160 associated with the second location, such as the worksite 112. For example, the system controller 122 receives the fourth location information from the haul truck 104a, and compare the fourth location information to the known location of the geofence 160 associated with the second location of the worksite 112. Based on the comparison (e.g., determining that the haul truck 104a is currently outside of the boundary defined by the geofence 160), the system controller 122 determines that the haul truck 104a has departed the worksite 112. In examples where a geofence surrounds the paving location within the worksite 112, the system controller 122 may also receive location information from the haul truck 104a to determine whether the haul truck 104a has left a boundary of a geofence associated with a paving location of the worksite 112 as well.

At 524, the system controller 122 generates fourth instructions which, when executed by the electronic device 128, cause the electronic device 128 to update the location of the visual indicia 206a on the map 204 and to change the characteristic of the visual indicia 206a to indicate that the vehicle has departed the second geofence 160. In some examples, the user interface 200 depicts the location of the visual indicia 206a on the map 204 outside of the geofence 160 illustrated on the map 204, such as between the worksite 112 and the paving material plant 102. As discussed above, the characteristic of the visual indicia 206a may be a shade of the color of the visual indicia 206a, such that the shade changes as responsive to the haul truck 104a exiting the geofence 160 associated with the worksite 112. Continuing with the illustrative example above, where the visual indicia 206 of each of the haul trucks 104 associated with a particular project and/or the worksite 112 are red, the specific one of the visual indicia 206a corresponding to the haul truck 104a may change from the third shade of red to a fourth shade of red to indicate departure of the haul truck 104a from the worksite 112. At 526, the system controller 122 provides the fourth instructions to the electronic device 128 via the network 124. Similar to the discussion above, the system controller 122 provides the fourth instructions to the truck controller 152 to display the user interface 133 on the display 156 of the haul truck 104a.

At 528, the system controller 122 receives fifth location information indicating that the vehicle has again arrived at the first geofence 158 associated with the first location, such as the paving material plant 102. For example, the system controller 122 receives the fifth location information from the haul truck 104a, and compare the fifth location information to the known location of the geofence 158 associated with the first location of the paving material plant 102. Based on the comparison (e.g., determining that the haul truck 104a is currently inside of the boundary defined by the geofence 158), the system controller 122 determines that the haul truck 104a has returned to the paving material plant 102.

At 530, the system controller 122 generates fifth instructions which, when executed by the electronic device 128, cause the electronic device 128 to update the location of the visual indicia 206a on the map 204 and to change the characteristic of the visual indicia 206a to indicate that the vehicle has arrived at the first geofence 158. In some examples, the user interface 200 depicts the location of the visual indicia 206a on the map 204 inside of the geofence 158 illustrated on the map 204, such as at the paving material plant 102. As discussed above, the characteristic of the visual indicia 206a may be a shade of the color of the visual indicia 206a, such that the shade changes as responsive to the haul truck 104a entering the geofence 158 associated with the paving material plant 102. Continuing with the illustrative example above, where the visual indicia 206 of each of the haul trucks 104 associated with a particular project and/or the worksite 112 are red, the specific one of the visual indicia 206a corresponding to the haul truck 104a may change from the fourth shade of red to a fifth shade of red to indicate the return of the haul truck 104a to the paving material plant 102. At 532, the system controller 122 provides the fifth instructions to the electronic device 128 via the network 124. Similar to the discussion above, the system controller 122 provides the fifth instructions to the truck controller 152 to display the user interface 133 on the display 156 of the haul truck 104a. In some examples, the method 500 may return to the operation 502, where the system controller 122 associates the haul truck 104a with a project. For instance, the system controller 122 generates project information, such as a ticket, which instructs the haul truck 104a to stay with the same project, to switch to a different project, and/or to discontinue transporting material for some amount of time (e.g., until the following day), to name a few examples.

For example, the system controller 122 may continue to monitor a location of the haul truck 104a to determine whether to disassociate the haul truck 104a from the project or the worksite 112. For example, the system controller 122 receives location information from the haul truck 104a that indicates that the haul truck 104a has remained generally at a same location (e.g., has not moved at all (is parked), is within a 100 foot radius, is within a quarter mile radius, etc.) for greater than a threshold amount of time (e.g., 30 minutes, one hour, two hours, etc.). Based on determining that the haul truck 104*a* has remained at a generally same location for an amount of time greater than the threshold amount of time, the system controller 122 determines to disassociate the haul truck 104*a* from the project. In examples, the system controller 122 generates instructions which, when executed by the electronic device 128, cause the electronic device 128 to change the characteristic of the visual indicia 206*a* to indicate that the haul truck 104*a* is no longer associated with the project. For instance, the instructions cause the electronic device 128 change the color of the visual indicia 206*a* from red to gray in the user interface 200 to indicate that the haul truck 104*a* is no longer associated with the worksite 112. This provides the foreman with an indication of which haul trucks 104 are able to be reassigned to a project, while preventing the system controller 122 from indicating inefficiencies within a project by generally stationary vehicles that remain associated with a project when no longer in use.

Additionally, in some examples, the system controller 122 may make additional determinations about the haul truck 104*a* before providing one or more of the instructions to the electronic device 128 to change the characteristic of the visual indicia 206*a*. For example, the system controller 122 determines whether the location of the haul truck 104*a* is reported as being within (or outside of) the geofence 158 and/or the geofence 160 for at least a threshold amount of time (e.g., 30 seconds, 1 minute, 5 minutes, etc.) before sending an instruction to change the visual indicia 206*a* from one shade to another shade associated with the particular project. The system controller 122 may use a threshold amount of time, a number of GPS pings received from the haul truck 104*a*, or some other unit of measurement to determine whether the haul truck 104*a* has been at a location long enough to change the characteristic of the visual indicia 206*a*. Using a threshold amount of time before changing the characteristic of the visual indicia 206*a* enables the system controller 122 to account for inaccuracies in location information reported by the haul truck 104*a*, the haul truck 104*a* rapidly entering and exiting a geofence, and the like.

Alternatively or additionally, the system controller 122 may evaluate which locations the haul truck 104*a* has been to since receiving the project information, an order of the previous locations, how long the haul truck 104*a* spent at each of the previous locations, and so forth before changing the characteristic of the visual indicia 206*a*. In an illustrative example, the system controller 122 receives location information indicating that the haul truck 104*a* has left the paving material plant 102 and returned to the paving material plant 102 without visiting the worksite 112. For instance, a driver of the haul truck 104*a* may have forgotten a piece of equipment at the paving material plant 102 after departing with a load of material, and went back to the paving material plant 102 to retrieve the piece of equipment before continuing to the worksite 112. Accordingly, the system controller 122 maintains the shade of the color of the visual indicia 206*a* indicating that the haul truck 104*a* has left the paving material plant 102 while the haul truck 104*a* returns within the geofence 158 of the paving material plant 102 for at least a period of time (e.g., 10 minutes), based on the haul truck 104*a* not delivering material to the worksite 112 according to the typical workflow of material delivery.

Figure 6:
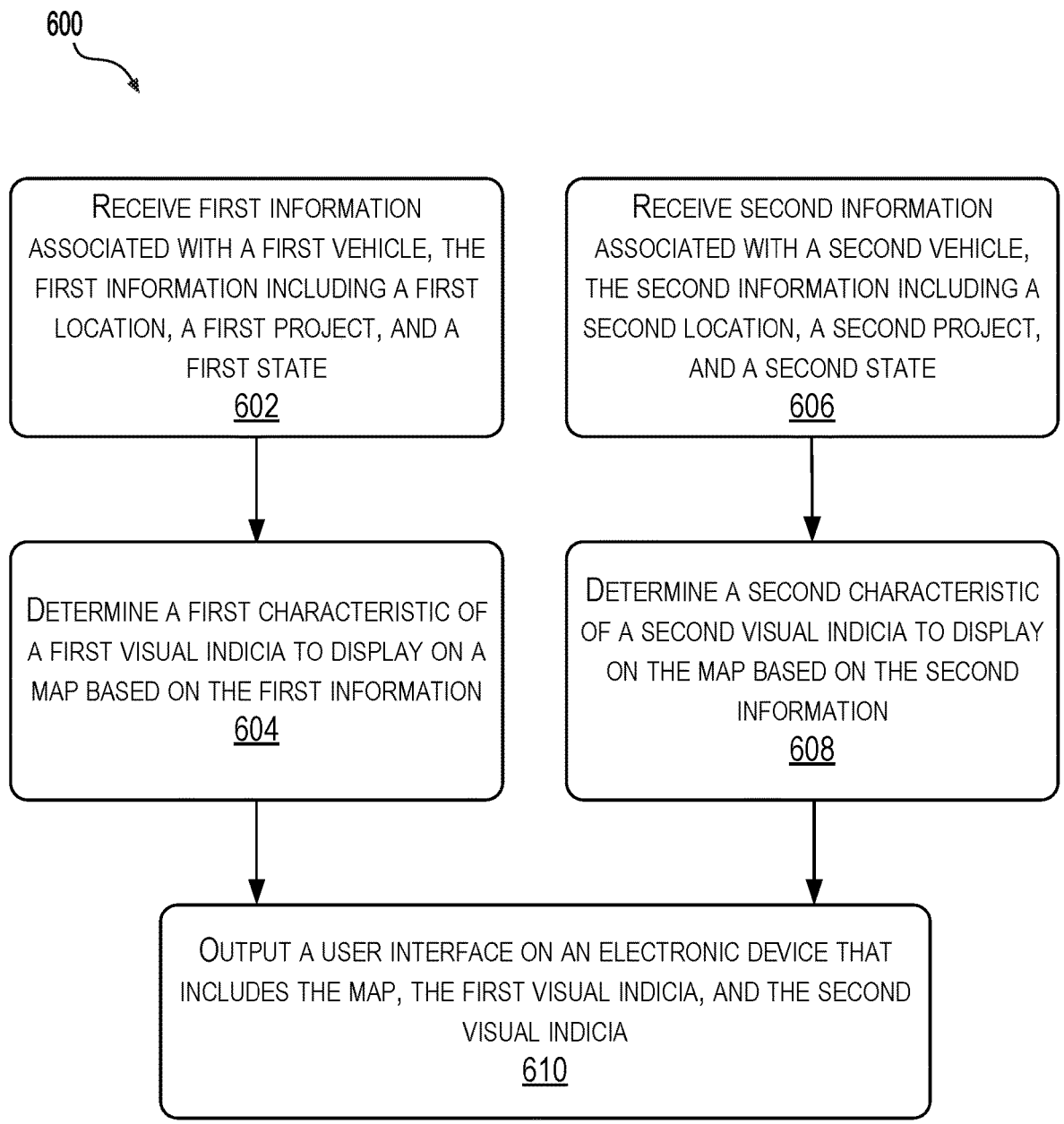
FIG. 6 is a flow chart depicting an example method of outputting a user interface that includes visual indicia representing vehicles associated with different projects by the electronic device shown in FIG. 1.

FIG. 6 illustrates a flow chart depicting an example method 600 of the electronic device 128 outputting a user interface that includes visual indicia, such as the visual indicia 206, representing vehicles associated with different projects. The example method 600 is illustrated as a collection of steps in a logical flow diagram, which represents operations that may be implemented in hardware, software, or a combination thereof. In the context of software, the steps represent computer-executable instructions stored in memory. When such instructions are executed by, for example, the system controller 122, such instructions may cause the system controller 122, various components of the control system 120, the paving material plant controller 142, the truck controller 152, and/or other components of the paving system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process, and/or with any of the operations described in relation to the method of FIG. 5. For discussion purposes, and unless otherwise specified, the method 600 is described with reference to the paving system 100, the control system 120, the paving material plant 102, the haul trucks 104, and/or other items shown in FIGS. 1-4. In particular, although any part of and/or the entire method 600 may be performed by the truck controller 152, the vehicle tracking system 131, the paving material plant controller 142, system controller 122, and/or other components of the paving system 100, unless otherwise specified the method will be described below with respect to the electronic device 128 for ease of description.

With reference to FIG. 6, at 602 the electronic device 128 receives first information associated with a first vehicle (e.g., the haul truck 104*a*), where the first information includes a first location, a first project, and a first state of the first vehicle. In some examples, the first information is included in a ticket generated by the system controller 122 and distributed to the haul truck 104*a* (and/or a driver of the haul truck 104*a*). The driver of the haul truck 104*a* may use the project information included in the ticket to determine a location of the worksite 112 associated with the first project to deliver material to, a type of material to obtain at the paving material plant 102 to deliver to the worksite 112, a time at which to load the haul truck 104*a*, and so forth. Additionally, at least some of the project information included in the ticket is provided to the electronic device 128 as instructions to output a visual indicia 206*a* associated with the haul truck 104*a*. The project information provided to the electronic device 128 may include, in some examples, the project or the worksite 112 that the haul truck 104*a* has been assigned to, and a state of the haul truck 104*a*, such as material type to be transported by the haul truck 104*a*, whether the haul truck 104*a* is loaded or substantially unloaded, and the like. In some cases, the system controller 122 provides the electronic device 128 with location information about the haul truck 104*a* such as GPS coordinates or an indication as to a location of the haul truck 104*a* relative to the geofence 158 and/or the geofence 160. Examples are considered in which the haul truck 104*a* provides the electronic device 128 with location information directly as well.

At 604, the electronic device 128 determines a characteristic of a first visual indicia 206*a* to display on a map 204 based on the first information. In some examples, the electronic device 128 determines a color to display the visual indicia 206*a* associated with a particular project that corresponds to the first project indicated in the first information. For instance, the system controller 122 instructs the electronic device 128 to display visual indicia 206 associated with the first project in blue. Based on receiving the first information indicating that the haul truck 104a is associated with the first project, the electronic device 128 may display the visual indicia 206a in blue. The electronic device 128 may determine other characteristics to display as part of the visual indicia 206a as well based on the first state of the haul truck 104a included in the first information, such as a location along the travel path 114 of the haul truck 104a, whether the haul truck 104a is loaded or substantially unloaded, a material that the haul truck 104a is loaded with (if loaded), a task being completed by the haul truck 104a, and so on.

At 606, the electronic device 128 receives second information associated with a second vehicle (e.g., the haul truck 104b), where the second information includes a second location, a second project, and a second state of the second vehicle. The electronic device 128 receives the second information before the first information, after the first information, or at substantially a same time as the first information. Similar to the first information, the second information is also included in a ticket generated by the system controller 122 and distributed to the haul truck 104b (and/or a driver of the haul truck 104b). The driver of the haul truck 104b may use the project information included in the ticket to determine a location of a worksite (e.g., different from the worksite 112) associated with the second project to deliver material to, a type of material to obtain at the paving material plant 102 to deliver to the worksite, a time at which to load the haul truck 104a, and so forth. Additionally, at least some of the project information included in the ticket is provided to the electronic device 128 as instructions to output a visual indicia 208a associated with the haul truck 104b. The project information provided to the electronic device 128 may include, in some examples, the project or the worksite that the haul truck 104b has been assigned to, and a state of the haul truck 104b, such as material type to be transported by the haul truck 104b, whether the haul truck 104b is loaded or substantially unloaded, and the like. In some cases, the system controller 122 provides the electronic device 128 with location information about the haul truck 104b such as GPS coordinates or an indication as to a location of the haul truck 104b relative to the geofence 158 and/or a geofence associated with the additional worksite. Examples are considered in which the haul truck 104b provides the electronic device 128 with location information directly as well.

At 608, the electronic device 128 determines a characteristic of a second visual indicia 208a to display on the map 204 based on the second information. In some examples, the electronic device 128 determines a color to display the visual indicia 208a associated with a particular project that corresponds to the second project indicated in the second information. For instance, the system controller 122 may instruct the electronic device 128 to display visual indicia 208 associated with the second project in red. Based on receiving the second information indicating that the haul truck 104b is associated with the second project, the electronic device 128 displays the visual indicia 208a in red. The electronic device 128 may determine other characteristics to display as part of the visual indicia 208a as well based on the second state of the haul truck 104b included in the second information, such as a location along a travel path of the haul truck 104b between the paving material plant 102 and the additional worksite, whether the haul truck 104b is loaded or substantially unloaded, a material that the haul truck 104b is loaded with (if loaded), a task being completed by the haul truck 104b, and so on.

At 610, the electronic device 128 outputs a user interface 133 that includes the map 204, the first visual indicia 206a, and the second visual indicia 208a. The visual indicia 206a and the visual indicia 208a are represented on the map 204 based on the location information received (directly or indirectly via the system controller 122) from the haul truck 104a and the haul truck 104b, respectively. In examples, the electronic device 128 outputs the visual indicia 206a and the visual indicia 208a in the user interface 133 having a characteristic that visually differentiates the project that the haul truck 104a has been associated with from the project that the haul truck 104b has been associated with. As mentioned above, the electronic device 128 may output the visual indicia 206a in blue and the visual indicia 208a in red to represent the different projects that the haul truck 104a and the haul truck 104b have been assigned to. Additionally, in some cases, the visual indicia 206a and the visual indicia 208a may have additional characteristics displayed in the user interface 133 as well corresponding to states of the respective haul trucks, such as is described in relation to FIGS. 4 and 5.

INDUSTRIAL APPLICABILITY

The present disclosure describes systems and methods for tracking vehicle locations and states throughout a project, and amongst different projects, using visual indicia 206, 208, and/or 210. For example, such systems and methods may enable a system controller 122 of a control system 120 to determine impedances on one or more projects, to appropriately assign and/or reallocate haul trucks 104 to different projects, dispatch haul trucks 104 to ensure efficient project progress, and so forth. The system controller 122 may receive location data from one or more haul trucks 104 of the paving system 100 to monitor locations of the haul trucks 104 as the haul trucks 104 deliver material to the worksite 112 and return to the paving material plant 102. The system controller 122 may provide such information to a display 202 of an electronic device 128. For example, the system controller 122 may generate a user interface 200 that includes such information and may provide the user interface 200 to the electronic device 128. The user interface 200 includes visual indicia corresponding to individual ones of the haul trucks 104 based on locations of the haul trucks 104, one or more projects that the individual ones of the haul trucks 104 are associated with, and other characteristics of the haul trucks such as whether the haul trucks 104 are loaded or substantially unloaded, a material being hauled by individual ones of the haul trucks 104, a task being performed by individual ones of the haul trucks 104, and so forth. As a result, a foreman of the worksite 112 may be able to quickly identify which of the haul trucks 104 are associated with different projects, identify impedances of the different projects based on locations of the haul trucks 104, reallocate the haul trucks 104 amongst the different projects, and so on to maximize efficiency of the haul trucks 104 across multiple projects.

As noted above with respect to FIGS. 1-4, an example method 500 of tracking locations and states of haul trucks 104 while a project is taking place may include associating a vehicle (e.g., a haul truck 104a) with a project. Such a method may also include receiving first location information indicating that the vehicle is disposed at a first location. Such a method 500 may also include generating first instructions which, when executed by the electronic device 128, cause the electronic device 128 to display a user interface 200 comprising a map 204 and visual indicia 206 representing the vehicle being disposed at the first location, where the visual indicia 206 is indicative of the project. Such a method 500 may also include providing the first instructions to the electronic device 128 via the network 124. Such a method 500 may further include receiving second location information indicating that the vehicle has departed a first geofence 158 associated with the first location. Such a method 500 may also include generating second instructions which, when executed by the electronic device 128, cause the electronic device 128 to update a location of the visual indicia 206 on the map 204 and to change a characteristic of the visual indicia to indicate that the vehicle has departed the first geofence 158. Such a method 500 may also include providing the second instructions to the electronic device 128 via the network 124. Such a method 500 may also include receiving third location information indicating that the vehicle has arrived at a second geofence 160 associated with a second location. Such a method 500 may also include generating third instructions which, when executed by the electronic device 128, cause the electronic device 128 to update the location of the visual indicia 206 on the map 204 and to change the characteristic of the visual indicia 206 to indicate that the vehicle has arrived at the second geofence 160. Such a method 500 may further include providing the third instructions to the electronic device 128 via the network 124. Such a method 500 may also include receiving fourth location information indicating that the vehicle has departed the second geofence 160 associated with the second location. Such a method 500 may also include generating fourth instructions which, when executed by the electronic device 128, cause the electronic device 128 to update the location of the visual indicia 206 on the map 204 and to change the characteristic of the visual indicia 206 to indicate that the vehicle has departed the second geofence 160. Such a method 500 may further include providing the fourth instructions to the electronic device 128 via the network 124. Such a method 500 may also include receiving fifth location information indicating that the vehicle has returned to the first geofence 158 associated with the first location. Such a method 500 may also include generating fifth instructions which, when executed by the electronic device 128, cause the electronic device 128 to update the location of the visual indicia 206 on the map 204 and to change the characteristic of the visual indicia 206 to indicate that the vehicle has returned to the first geofence 158. Such a method 500 may further include providing the fifth instructions to the electronic device 128 via the network 124. Such a method 500 may also include returning to associating the vehicle with a project.

As described above, the system controller 122 may also generate a user interface 200 that includes information indicative of the locations and states of the haul trucks 104 using the visual indicia 206, the visual indicia 208, and/or the visual indicia 210. The system controller 122 may provide the user interface 200 to the electronic device 128. As a result, a foreman is able to determine the locations and states of the haul trucks 104 in near real time, and/or can replay a time period to review the previous locations and states of the haul trucks 104. In some examples, the system controller 122 may also enable filtering of which of the haul trucks 104 are displayed in the user interface 200 based on projects that individual ones of the haul trucks 104 are associated with or other states of the haul trucks 104.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system, comprising:
 a haul truck configured to haul material from a paving material plant to a worksite; and
 a system controller in communication with a controller of the haul truck, the system controller being configured to:
   receive first location information indicating that the haul truck is located at the paving material plant;
   based on the first location information, associate the haul truck with a project of a plurality of projects, wherein the project is associated with the worksite;
   generate first instructions configured to be executed by an electronic device;
   provide the first instructions to the electronic device via a network, the first instructions causing the electronic device to display a user interface comprising:
    a map illustrating the paving material plant, and
    visual indicia comprising an image of the haul truck disposed at the paving material plant, the image of the haul truck having:
     a visual characteristic indicative of the project of the plurality of projects with which the haul truck is associated, and
     a visual characteristic indicative of the first location information;
   receive second location information indicating that the haul truck has departed the paving material plant;
   generate second instructions;
   provide the second instructions to the electronic device via the network, the second instructions causing the electronic device to:
    update a location of the image of the haul truck on the map,
    change, in the image of the haul truck and based on the second location information, the visual characteristic indicative of the first location information to a visual characteristic indicating that the haul truck has left the paving material plant, and
    maintain, in the image of the haul truck, the visual characteristic indicative of the project;
   receive third location information indicating that the haul truck has arrived at the worksite;
   generate third instructions; and
   provide the third instructions to the electronic device via the network, the third instructions causing the electronic device to:
    update the location of the image of the haul truck on the map,
    change, in the image of the haul truck and based on the third location information, the visual characteristic indicating that the haul truck has left the paving material plant to a visual characteristic indicating that the haul truck has arrived at the worksite.

2. The system according to claim 1, the system controller being further configured to:

receive fourth location information from the haul truck indicating that the haul truck has left the worksite;

generate fourth instructions which, when executed by the electronic device, cause the electronic device to update the location of the image of the haul truck on the map and to change the visual characteristic indicating that the haul truck has arrived at the worksite to a visual characteristic indicating that the haul truck has departed the worksite; and provide the fourth instructions to the electronic device via the network.

3. The system according to claim 2, the system controller being further configured to:

receive fifth location information from the haul truck indicating that the haul truck has returned to the paving material plant from the worksite;

generate fifth instructions which, when executed by the electronic device, cause the electronic device to update the location of the image of the haul truck on the map and to change the visual characteristic indicating that the haul truck has departed the worksite to a visual characteristic indicating that the haul truck has returned to the paving material plant from the worksite; and provide the fifth instructions to the electronic device via the network.

4. The system according to claim 1, the system controller being further configured to:

receive fourth location information from the haul truck indicating that the haul truck has arrived at a paving location within the worksite;

generate fourth instructions which, when executed by the electronic device, cause the electronic device to update the location of the image of the haul truck on the map and to change the visual characteristic indicating that the haul truck has arrived at the worksite to a visual characteristic indicating that the haul truck has arrived at a paving location within the worksite; and provide the fourth instructions to the electronic device via the network.

5. The system according to claim 1, the system controller being further configured to:

generate a ticket associated with the project while the haul truck is located at the paving material plant, the ticket indicating one or more of a task to be completed by the haul truck or a type of material to be hauled by the haul truck, wherein the visual indicia comprises an outline corresponding to the task to be completed by the haul truck or an overlay icon indicating the type of material to be hauled by the haul truck as indicated by the ticket.

6. The system according to claim 1, wherein:

the first instructions or the second instructions are generated based on comparing the first location information or the second location information with GPS coordinates of a first geofence associated with the paving material plant, and the third instructions are generated based on comparing the third location information with GPS coordinates of a second geofence at the worksite.

7. The system according to claim 1, wherein:

the visual characteristic indicative of the first location information is a first color of the visual indicia, and changing the visual characteristic indicative of the first location information comprises changing the first color to a second color different from the first color.

8. The system according to claim 1, wherein the visual characteristic indicative of the project is a color of the visual indicia, the system controller being further configured to:

receive fourth location information from the haul truck;

determine, based on the fourth location information, that the haul truck has been disposed at a particular location for an amount of time that is greater than a threshold amount of time;

determine, based on the amount of time being greater than the threshold amount of time, that the haul truck is no longer associated with the project;

generate fourth instructions which, when executed by the electronic device, cause the electronic device to change the visual characteristic indicative of the project to indicate that the haul truck is no longer associated with the project; and provide the fourth instructions to the electronic device via the network.

\* \* \* \* \*